Dec. 17, 1929.                R. M. SCHLEGEL ET AL                1,739,803
LINE SHAFT BEARING LUBRICATING DEVICE
Filed April 26, 1927     2 Sheets-Sheet 2
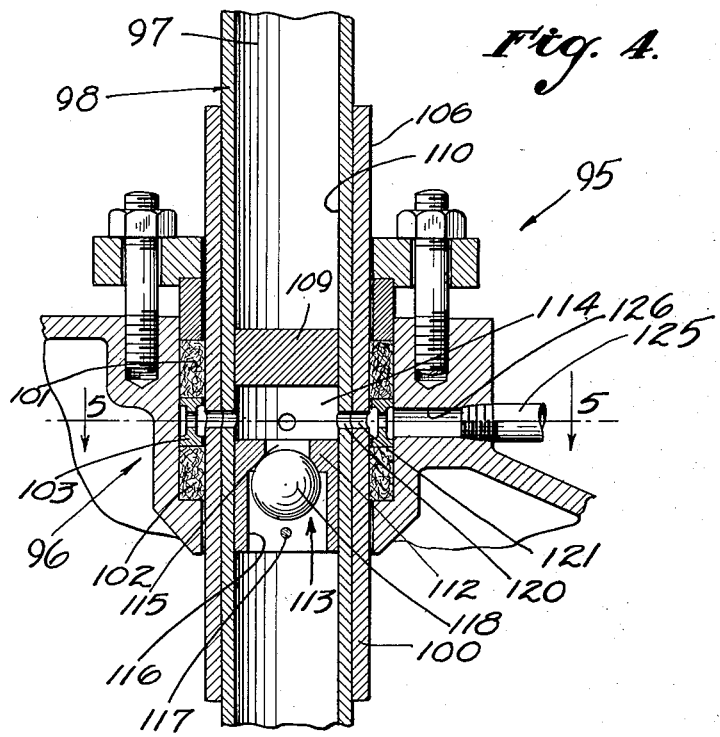
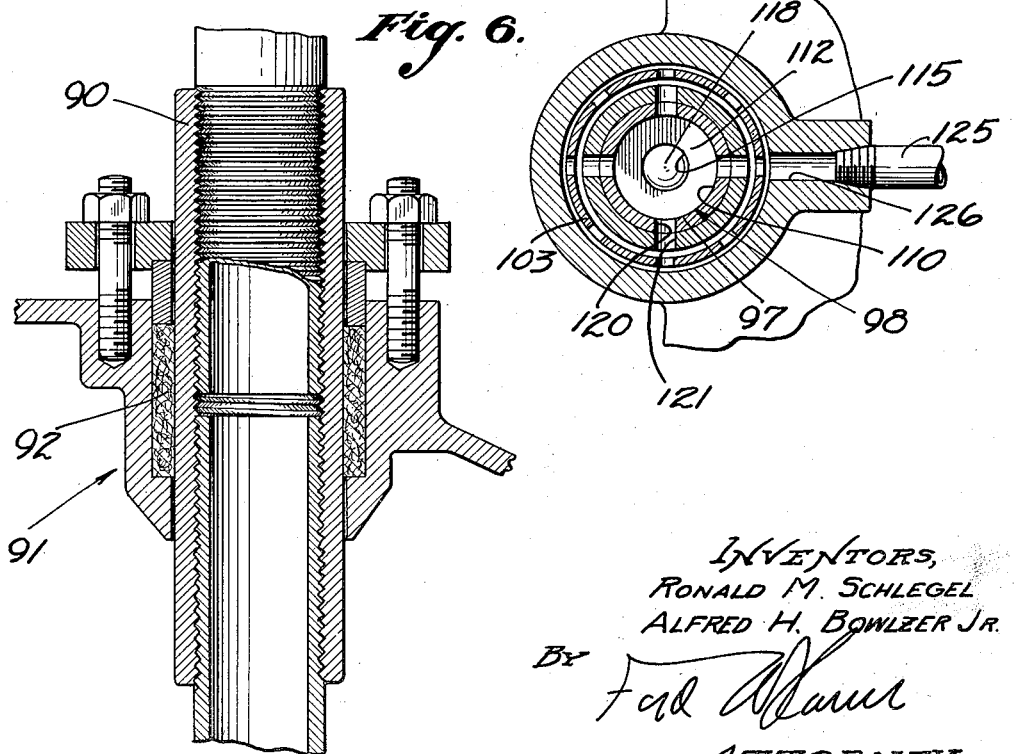
INVENTORS,
RONALD M. SCHLEGEL
ALFRED H. BOWLZER JR.
BY
ATTORNEY.

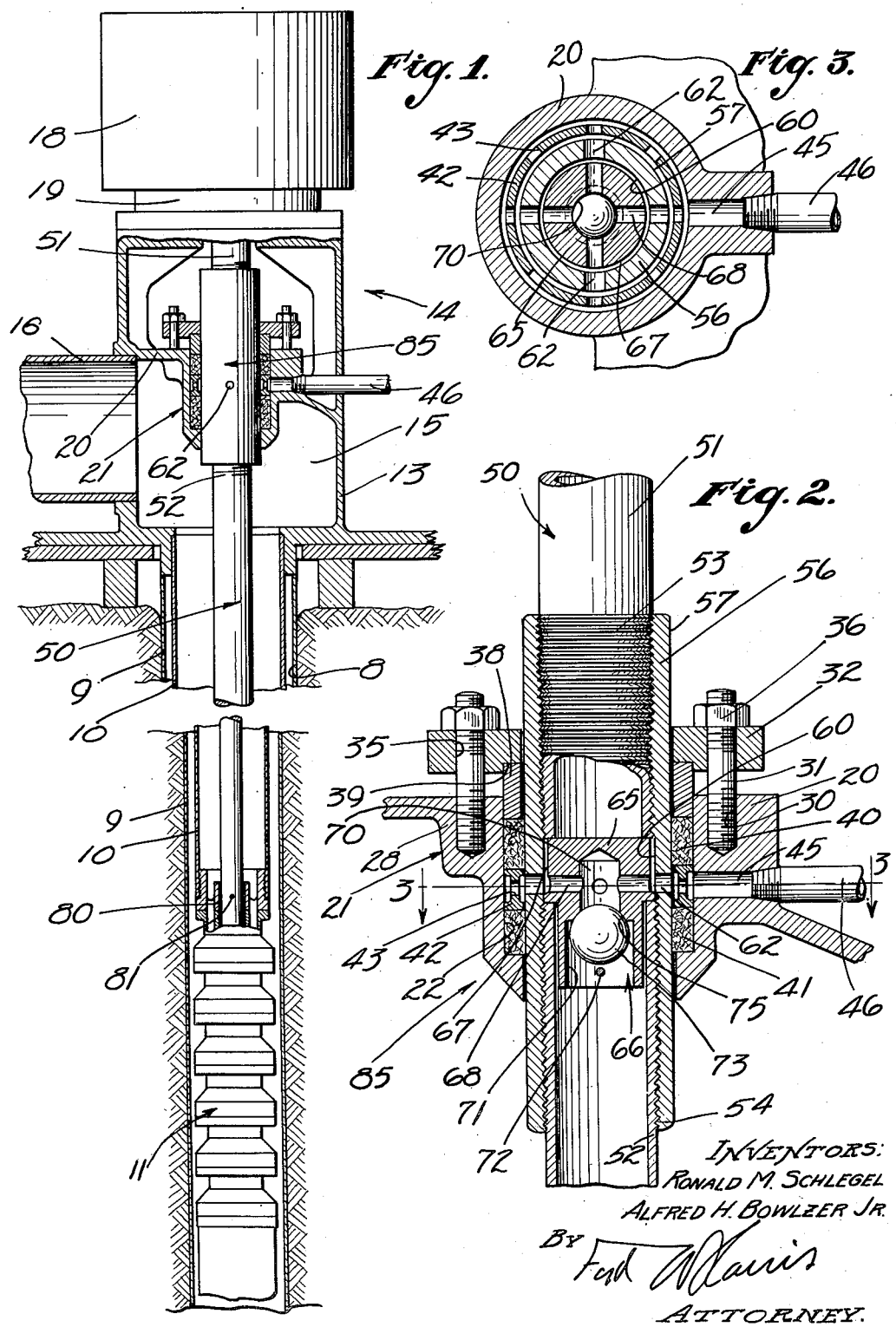

Patented Dec. 17, 1929

1,739,803

UNITED STATES PATENT OFFICE

RONALD M. SCHLEGEL AND ALFRED H. BOWLZER, JR., OF LOS ANGELES, CALIFORNIA, ASSIGNORS, BY MESNE ASSIGNMENTS, TO KIMBALL-KROGH PUMP COMPANY, A CORPORATION OF DELAWARE

LINE-SHAFT-BEARING-LUBRICATING DEVICE

Application filed April 26, 1927. Serial No. 186,636.

Our invention relates to stuffing box constructions in general, and has for its object to provide a stuffing box combination including journalling means and lubricating means. Although our invention is useful in various machines, it has a marked utility in turbine pumps and will therefore be described in this connection. The various instrumentalities included in the entire invention are susceptible of individual use, as will be pointed out in the following description.

In order that the advantages of the invention may be apparent, a brief description of the well-known turbine pump will now be made. A common type of turbine well pump includes a pump section, a column pipe, a pump head and a line shaft. The pump section is placed at the bottom of a well and the column pipe extends upward from the pump to conduct water or oil to the surface of the ground. The pump head is provided at the top of the column pipe and has a vestibule chamber connecting the column pipe with a discharge pipe. The line shaft extends upward from the pump through the column pipe and, passing through a stuffing box in the wall of the vestibule chamber, connects with a rotating means, such as a pulley or an electric motor, provided on the pump head. By this means the line shaft is rotated to operate the pump and raise liquid through the column pipe into the discharge pipe.

The line shaft journals in vertical radial bearings disposed at intervals throughout the length of the column pipe. These bearings, as well as bearings of the pump disposed at the lower end of the column pipe, require lubrication. This may be accomplished by making the line shaft from tubing and supplying a lubricant to these bearings through the line shaft. At present the rotation of the line shaft must be halted when it is desired to supply lubricant to the interior thereof, halts for this purpose being required with sufficient frequency to considerably reduce the amount of liquid which the pump can raise in a long period of pumping.

It is an object of our invention to provide a line shaft bearing lubricating device by which lubricant may be injected into the interior of a hollow line shaft while this shaft is rotating.

It is another object of our invention to provide a lubricating device which includes a stuffing box through which lubricant may be supplied to the interior of the hollow shaft while it is in rotation.

In pump constructions of the general type the shaft which extends through the head is a special shaft, and is joined to the shaft which extends through the column pipe by means of a coupling. This coupling is located between the stuffing box of the pump head and the top shaft bearing. Because of its position between the stuffing box and the shaft bearing, this coupling is not guided. The fact is generally known among machinery manufacturers that it is very difficult to manufacture threaded machinery parts that are absolutely in alignment and concentric. When the coupling is placed in the manner mentioned and is not guided or running in a bearing, the coupling and shaft which rotate at high rotative speeds will vibrate or whip if the coupling is not in absolute alignment. This results in unnecessary and detrimental wear and damage to various parts of the pump, particularly the upper part of the shaft which is liable to break and the stuffing box which is subjected to much wear.

In the present invention we overcome the whipping of the coupling and shaft by placing the coupling so that it rotates in the stuffing box. The advantages of this arrangement are that no damage is done by whipping and the wear in the stuffing box is on the coupling which is easily replaced.

When lubricant has been injected into the interior of a hollow line shaft, it tends to expand and flow out of the opening through which it was injected.

It is therefore another object of our invention to provide a line shaft bearing lubricating device, as above mentioned, which prevents a counterflow of lubricant out of said shaft.

Other objects and advantages will be made manifest in the following description and the accompanying drawings in which a preferred embodiment of our invention, with modifications thereof, are shown and described.

In the drawings, Fig. 1 is a diagrammatic view illustrating the utility of our invention.

Fig. 2 is an enlarged fragmentary sectional view illustrating a preferred form of the novel lubricating device of our invention.

Fig. 3 is a horizontal sectional view taken on the line 3—3 of Fig. 2.

Fig. 4 is a vertical sectional view illustrating a modified form of the lubricating device of our invention.

Fig. 5 is a horizontal sectional view taken on the line 5—5 of Fig. 4.

Fig. 6 is a fragmentary vertical sectional view through the stuffing box of a pump head and illustrating a novel combined shaft bearing sleeve and collar which forms a part of the preferred form of our invention.

Referring specifically to the drawings, 8 indicates a well having a casing 9 in which a column pipe 10 is disposed so as to extend from the top of the well downward to a point below the surface of the water or other liquid flowing into the well, a multi-stage pump 11 being connected to the lower end of the column pipe 10. The column pipe 10 is supported at its upper end in the body casting 13 of a pump head 14. A vestibule chamber 15 is formed in the pump head body 13 and connects the upper end of the column pipe 10 with a pumped-fluid discharge pipe 16.

The pump head 14 has a pulley wheel 18 mounted upon suitable bearings provided upon a neck 19 formed upon the upper portion of the body casting 13. An upper wall 20 of the vestibule chamber 15 has a stuffing box 21, the stuffing box chamber 22 of which is vertically disposed in axial alignment with the column pipe 10 and the pulley wheel 18. Bosses 28 formed in the wall 20 about the chamber 22 are provided with threaded apertures 30 which receive threaded studs 31. A clamping ring 32 has holes 35 adapted to receive the upper ends of the studs 31. Nuts 36 as screwed on to the upper ends of the studs 31 to force the ring 32 downward. A gland 38 is received in a recess 39 formed in the lower side of the clamping ring 32, the gland 38 being slidably received in the chamber 22. Upper and lower annular packing rings 40 and 41 are disposed in the stuffing box chamber 22 and are separated by a lantern 42, having interstices 43, as clearly shown in Fig. 2. A hole 45 is formed in the wall 20 to connect with the chamber 22 opposite the position occupied by the lantern 42. A lubricant supply pipe 46 is threadedly received in an outer end of the hole 45, the pipe 46 connecting with lubricant force feed means (not shown).

A line shaft 50 has upper and lower portions 51 and 52, adjacent ends of which are threaded as at 53 and 54 respectively. The upper line shaft portion 51 is connected by suitable means well known to the art to the pulley 18 for rotation thereby, and the adjacent threaded ends of the line shaft portions 51 and 52 are connected by a bearing sleeve coupling 56 which extends concentrically through the stuffing box 21, as shown in Fig. 1. The bearing sleeve coupling 56 is preferably formed of high carbon steel and the outer surface 57 thereof is ground to a true cylinder which is slightly less in diameter than that of the central openings in the various members of the stuffing box 21. The annular packing portions 40 and 41 are adapted to be expanded by a downward movement of the gland 38 so that they form a fluid-tight connection with the external bearing surface 57 of the bearing sleeve coupling 56.

A central space 60 is defined within the bearing sleeve coupling 56 between adjacent ends of the line shaft portions 51 and 52. Suitable holes 62, preferably four in number, are formed in the wall of the bearing sleeve coupling 56 so as to communicate between the space 60 and the interstices of the lantern 42. The lower end of the hollow line shaft portion 51 and the upper end of the hollow line shaft portion 52 have ground radial faces. The body block 65 of a check valve 66 has opposed ground radial faces and is adapted to be disposed in the space 60 so that these radial faces contact with the corresponding radial faces formed upon the adjacent ends of the line shaft portions 51 and 52 so that the block 65 substantially seals the adjacent ends of the hollow line shaft portions 51 and 52.

The upper portion of the block 65 is of less diameter than the central coupling chamber space 60 so as to form an annular space 67 which communicates with the holes 62 formed in the coupling wall. Radial holes 68 are formed in the block 65 to connect between the annular space 67 and a central hole 70 formed in the block 65. The central hole 70 has a counterbore 71 formed in its lower end which is provided with a transverse bar 72 to retain a check valve ball 73 in the upper portion of the counterbore 71. A valve seat 75 is formed at the juncture of the hole 70 with the counterbore 71, the ball 73 being adapted to rise, upon an upward flow of fluid through the counterbore 71, so as to close the check valve 66.

The lower portion 52 of the line shaft 50 extends downward through the column pipe 10 throughout the length thereof so that the lower end of the line shaft extends into the pump 11. When the pulley 18 is rotated by a suitable power means, connected thereto by a belt, the line shaft will rotate the impellers (not shown) of the pump 11 and cause an upward flow of fluid through the column pipe 10 and out through the discharge pipe 16. If the well is a deep one, it is necessary to provide line shaft bearings at suitable intervals in the column pipe 10 in which the line shaft 50 is journalled to maintain various portions of this shaft in alignment and prevent the shaft from whipping under the influence of its being rotated at a high rate of speed. Where the well 8 is deep, the line shaft 50 is formed of a considerable number of lengths connected together by couplings.

As pointed out in the introductory part of this specification it is very difficult to thread the coupling 56 absolutely concentric. In our invention any small amount of eccentricity of the coupling will not result in whipping because the coupling journals in the stuffing box.

The line shaft bearings as well as the bearings in the pump 11, an upper bearing 80 of which is shown in Fig. 1, require lubrication. One method of accomplishing this is to force a lubricant, such as a hard grease, downward through the line shaft 50, this lubricant passing outward through holes in the line shaft which are disposed in the zones of the bearings, such as the holes 81 in the zone of the bearing 80, thus lubricating these bearings during the rotation of the line shaft 50. The stuffing box 21, the bearing sleeve coupling 56 and the check valve 66 comprises a lubricating device 85 by which a lubricant may be forced into the hollow interior of the line shaft 50 while this is rotating.

The operation of the lubricating device 85 is as follows:

At certain intervals during a long period of operation of the pump 11, when the supply of lubricant within the line shaft 50 may have dropped below a certain level, the lubricant supply means is operated to supply lubricant through the pipe 46 and the hole 45 to the lantern 42. As the packing portions 40 and 41 form a fluid-tight fit with the outer surface 57 of the bearing sleeve coupling 56, the lubricant is forced to flow from the interstices of the lantern 42 inward through the holes 62, the annular space 67, the radial holes 68 and into the central valve body hole 70. Lubricant entering the hole 70 forces the ball 73 downward and fills the hollow interior of the lower line shaft portion 52 with lubricant. When the forced-feed means indicates that a certain pressure is required to force further lubricant through the ball valve 66, the pressure is released from the lubricant in the pipe 46 and the expansion of the lubricant within the lower line shaft portion 52 closes the check valve 66, thus retaining this lubricant in the line shaft.

In the rotary pumping apparatus in general use, the upper portion 51 of the line shaft 50 extends downward entirely through the stuffing box 21 and is joined to the lower portion 52 by an internally threaded coupling disposed below the stuffing box 21. A sleeve is pressed upon the upper line shaft portion 51 which is disposed in the stuffing box 21 in a position similar to the bearing sleeve coupling 56 shown in Fig. 2. These sleeves are extremely difficult to replace, it being necessary to have special tools for this purpose and requiring a skilled mechanic to accomplish this task.

The bearing sleeve coupling 56 may be used in a stuffing box 21 where forced-feed lubrication of the line shaft bearings through the line shaft is not desired, the bearing sleeve coupling 56 having the advantages of being easily removed merely by the application of wrenches to the line shaft portions 51 and 52 and to the bearing sleeve coupling 56. The bearing sleeve coupling 56 moreover combines in one member functions which require the use of two members in the apparatus in general use. The bearing sleeve coupling 56, when utilized without the lubricating device may be formed as shown in Fig. 6.

In Fig. 6, the bearing sleeve coupling is indicated by the numeral 90 and is of the same proportions as the bearing sleeve coupling 56 and extends through a stuffing box 91 which is substantially identical with the stuffing box 21 with the exception that the packing portions 40 and 41 and the lantern 42 are replaced by a single packing 92 which may be formed either unitary or in sections.

In Figs. 4 and 5 a modified form of lubricating device 95 is illustrated in which a stuffing box 96 is identical in construction with the stuffing box 21. The lubricating device 95 is formed with an upper portion 97 of a hollow line shaft 98 extending downward entirely through the stuffing box 96 in the manner at present in general use. A bearing sleeve 100 is disposed about the line shaft 98 and forms a press fit therewith. The sleeve 100 extends through the stuffing box 96 so that annular packers 101 and 102 on opposite sides of a lantern 103 form a fluid-tight fit with the outer surface 106 of the sleeve 100.

A plug 109 is substantially cylindrical in form and is pressed into a chamber 110 of the hollow line shaft 98 so that the plug 109 is disposed above the level of the lantern 103 and so that the outer surface of the plug 109 makes a fluid-tight fit with the walls of the chamber 110. The body 112 of a check valve 113 has substantially the same diameter as the plug 109 and is pressed into the line shaft 98 so as to cooperate with the plug 109 to form a closed space 114 in the chamber 110 which is opposite the lantern 103. The valve body 112 has a central opening 115 which has a lower counterbore 116 which is provided with a bar 117 which retains a ball 118 in the vicinity of a seat formed by the juncture of the opening 115 and the counterbore 116 so that the ball 118 is adapted to rise to prevent an upward flow of lubricant through the check valve 113, but permits lubricant to flow downward therethrough. Holes 120 and 121 are formed in the walls of the line shaft 98 and the sleeve 100 respectively, the holes 120 and 121 being in alignment and disposed opposite the lantern 103 of the stuffing box 96. Lubricant is supplied through a pipe 125 which connects with a hole 126 leading to the lantern 103. Due to the fluid-tight sealing engagement of the packers 101 and 102 with the surface 106 of the sleeve 100, the lubricant supplied to the lantern 103 flows through the interstices thereof and inward through the holes 120 and 121 into the chamber 114. From the chamber 114 the lubricant passes down around the ball 118 into the lower portion of the hollow line shaft 98.

The invention herein disclosed may be divided into two main parts, the lubricating parts and the bearing coupling both of which cooperate to produce a novel stuffing box combination. The lubricating device may be used with or without the bearing coupling, and the bearing coupling may be used with or without the lubricating device.

We claim as our invention:

1. In combination: a rotary pump head body, there being a discharge vestibule formed in said body; a stuffing box provided upon said body and opening from said vestibule; a hollow line shaft extending through said stuffing box and divided adjacent to said stuffing box; a coupling extending within said stuffing box and uniting adjacent ends of said shaft at said division therein; a lantern disposed in said stuffing box and dividing the packing thereof, there being means for supplying a lubricant to said lantern and an opening in said coupling through which said lubricant may pass from said lantern; and a valve member positioned within said coupling and permitting a flow of lubricant from said coupling opening downwardly into the interior of said shaft.

2. In combination: a rotary pump head body, there being a discharge vestibule formed in said body; a stuffing box provided upon said body and opening from said vestibule; a hollow line shaft extending through said stuffing box and divided adjacent to said stuffing box; a coupling extending within said stuffing box and uniting adjacent ends of said shaft at said division therein; a lantern disposed in said stuffing box and dividing the packing thereof, there being means for supplying a lubricant to said lantern and an opening in said coupling through which said lubricant may pass from said lantern; and a valve member positioned within said coupling by engagement of a portion thereof between adjacent ends of said line shafts and permitting a flow of lubricant from said coupling opening downwardly into the interior of said shaft.

3. In combination: a rotary pump head body, there being a discharge vestibule formed in said body; a stuffing box provided upon said body and opening from said vestibule; a hollow line shaft extending through said stuffing box and divided adjacent to said stuffing box; a coupling extending within said stuffing box and uniting adjacent ends of said shaft at said division therein; a lantern disposed in said stuffing box and dividing the packing thereof, there being means for supplying a lubricant to said lantern and an opening in said coupling through which said lubricant may pass from said lantern; and a valve member positioned within said coupling and restricting the flow of lubricant from said coupling opening to a flow downwardly into the interior of said shaft.

4. In combination: a rotary pump head body, there being a discharge vestibule formed in said body; a stuffing box provided upon said body and opening from said vestibule; a hollow line shaft extending through said stuffing box and divided adjacent to said stuffing box; a coupling extending within said stuffing box and uniting adjacent ends of said shaft at said division therein; a lantern disposed in said stuffing box and dividing the packing thereof, there being means for supplying a lubricant to said lantern and an opening in said coupling through which said lubricant may pass from said lantern; and a valve member positioned within said coupling by engagement of a portion thereof between adjacent ends of said line shafts and restricting the flow of lubricant from said coupling opening to a flow downwardly into the interior of said shaft.

5. In combination: a rotary pump head body, there being a discharge vestibule formed in said body; a stuffing box provided upon said body and opening from said vestibule; a hollow line shaft extending through said stuffing box; a sleeve tightly fitting said shaft and extending into said stuffing box so as to make a substantially fluid-tight fit therewith; a lantern disposed in said stuffing box and dividing the packing thereof, there being means for supplying a lubricant to said lantern and openings in said sleeve and said shaft through which said lubricant may pass from said lantern; and a valve member positioned within said shaft and permitting a flow of lubricant, from said shaft openings, downwardly into the interior of said shaft.

6. In combination: a rotary pump head body, there being a discharge vestibule formed in said body; a stuffing box provided upon said body and opening from said vestibule; a hollow line shaft extending through said stuffing box; a sleeve tightly fitting said shaft and extending into said stuffing box so as to make a substantially fluid-tight fit therewith; a lantern disposed in said stuffing box and dividing the packing thereof, there being means for supplying a lubricant to said lantern and openings in said sleeve and said shaft through which said lubricant may pass from said lantern; and a valve member positioned within said shaft and restricting the flow of lubricant, from said shaft openings, to a flow downwardly in the interior of said shaft.

7. In combination: walls forming a chamber; a stuffing box surrounding an opening connecting to said chamber; a primary shaft extending through said chamber and into said stuffing box; a secondary shaft extending into said stuffing box in axial alignment with said primary shaft; and an external coupling for joining said primary and said secondary shafts together against separation by axial strain, said coupling journalling in said stuffing box.

8. A combination as defined in claim 7 in which the ends of said primary and secondary shafts are threaded and screwed into said coupling.

9. In combination: walls forming a chamber; a stuffing box surrounding an opening connecting to said chamber; and a rotating shaft extending through said chamber and said stuffing box, said shaft including primary and secondary shaft members and an external coupling for connecting said primary and secondary shaft members together against separation by axial strain, said coupling being journalled in said stuffing box.

10. In combination: a hollow shaft; a stuffing box through which said hollow shaft extends, said stuffing box having a lubricating space, there being an opening in said hollow shaft connecting the interior thereof with said lubricant space; a lubricant supply means connected to said lubricant space; and a check valve in said hollow shaft for preventing a flow from the interior of said hollow shaft into said lubricant space.

11. In combination: a hollow shaft consisting of a pair of shaft members and an external coupling for joining same together against separation by axial strain; a stuffing box in which said coupling is journalled, said stuffing box having a lubricant space and said coupling having an opening connecting the interior of said hollow shaft with said lubricant space; and lubricant supply means connected to said lubricant space.

12. In combination: a hollow shaft consisting of a pair of shaft members and a coupling for joining same together; a stuffing box in which said coupling is journalled, said stuffing box having a lubricant space and said coupling having an opening connecting the interior of said hollow shaft with said lubricant space; lubricant supply means connected to said lubricant space; and a check valve in said hollow shaft for preventing a flow from the interior of said hollow shaft into said lubricant space.

13. A combination as defined in claim 12 in which said check valve is held between the ends of said primary and secondary shaft members.

In testimony whereof, we have hereunto set our hands at Los Angeles, California, this 18th day of April, 1927.
RONALD M. SCHLEGEL.
ALFRED H. BOWLZER, JR.